(12) United States Patent
Iwai et al.

(10) Patent No.: US 10,259,262 B2
(45) Date of Patent: Apr. 16, 2019

(54) BICYCLE RIM

(71) Applicant: Shimano Inc., Sakai, Osaka (JP)

(72) Inventors: Tooru Iwai, Sakai (JP); Tetsu Nonoshita, Sakai (JP); Toyoshi Yoshida, Sakai (JP)

(73) Assignee: SHIMANO INC., Sakai, Osaka (JP)

( * ) Notice: Subject to any disclaimer, the term of this patent is extended or adjusted under 35 U.S.C. 154(b) by 240 days.

(21) Appl. No.: 15/410,768

(22) Filed: Jan. 20, 2017

(65) Prior Publication Data

US 2018/0207979 A1 Jul. 26, 2018

(51) Int. Cl.
| | | |
|---|---|---|
| *B60B 25/00* | (2006.01) | |
| *B60B 21/06* | (2006.01) | |
| *B60B 5/02* | (2006.01) | |
| *B60B 21/00* | (2006.01) | |
| *B60B 21/02* | (2006.01) | |
| *B60B 1/04* | (2006.01) | |

(52) U.S. Cl.
CPC ............... *B60B 25/00* (2013.01); *B60B 5/02* (2013.01); *B60B 21/00* (2013.01); *B60B 21/025* (2013.01); *B60B 21/062* (2013.01); *B60B 1/043* (2013.01); *B60B 2310/204* (2013.01); *B60B 2310/208* (2013.01); *B60B 2320/10* (2013.01); *B60B 2360/10* (2013.01); *B60B 2360/104* (2013.01); *B60B 2360/341* (2013.01); *B60B 2900/111* (2013.01); *B60B 2900/113* (2013.01); *B60B 2900/1216* (2013.01); *B60B 2900/311* (2013.01)

(58) Field of Classification Search
CPC ....... B60B 25/00; B60B 1/043; B60B 21/062; B60B 2900/311; B60B 2310/208; B60B 2360/104; B60B 2310/204; B60B 2360/341; B60B 2900/111; B60B 2320/10
USPC .................................................... 301/95.102
See application file for complete search history.

(56) References Cited

U.S. PATENT DOCUMENTS

| | | | |
|---|---|---|---|
| 4,720,149 A * | 1/1988 | Thissen ................. | F16F 15/324 301/37.24 |
| 5,499,864 A * | 3/1996 | Klein .................... | B60B 21/062 301/58 |
| 7,013,939 B2 | 3/2006 | Rhyne et al. | |
| 8,746,808 B2 * | 6/2014 | Kuan .................... | B60B 21/025 29/894.333 |
| 2005/0161998 A1 * | 7/2005 | Passarotto ............... | B60B 1/003 301/61 |
| 2006/0273654 A1 | 12/2006 | Lien | |
| 2007/0200422 A1 | 8/2007 | Davis et al. | |

(Continued)

FOREIGN PATENT DOCUMENTS

| | | |
|---|---|---|
| DE | 102004047264 A1 | 4/2006 |
| EP | 1518717 A1 | 3/2005 |

(Continued)

*Primary Examiner* — S. Joseph Morano
*Assistant Examiner* — Jean W Charleston
(74) *Attorney, Agent, or Firm* — United IP Counselors, LLC

(57) ABSTRACT

A bicycle rim comprises a base member, a cover member, and a spoke attachment member. The base member includes a truss structure that defines at least one opening. The cover member at least partly covers the at least one opening of the base member. The spoke attachment member is a separate member from the base member and the cover member. The spoke attachment member is non-rotatably attached to the base member.

43 Claims, 9 Drawing Sheets

(56) References Cited

U.S. PATENT DOCUMENTS

| | | | |
|---|---|---|---|
| 2008/0231106 A1* | 9/2008 | Chen | B60B 1/041 |
| | | | 301/95.106 |
| 2009/0195055 A1* | 8/2009 | Chen | B60B 1/041 |
| | | | 301/95.104 |
| 2014/0346849 A1* | 11/2014 | Shiotani | B60B 21/00 |
| | | | 301/95.102 |
| 2016/0263935 A1 | 9/2016 | Tschanz et al. | |

FOREIGN PATENT DOCUMENTS

| | | |
|---|---|---|
| EP | 1016553 B1 | 7/2005 |
| EP | 1475246 B1 | 2/2009 |
| WO | 2004/091937 A1 | 10/2004 |

\* cited by examiner

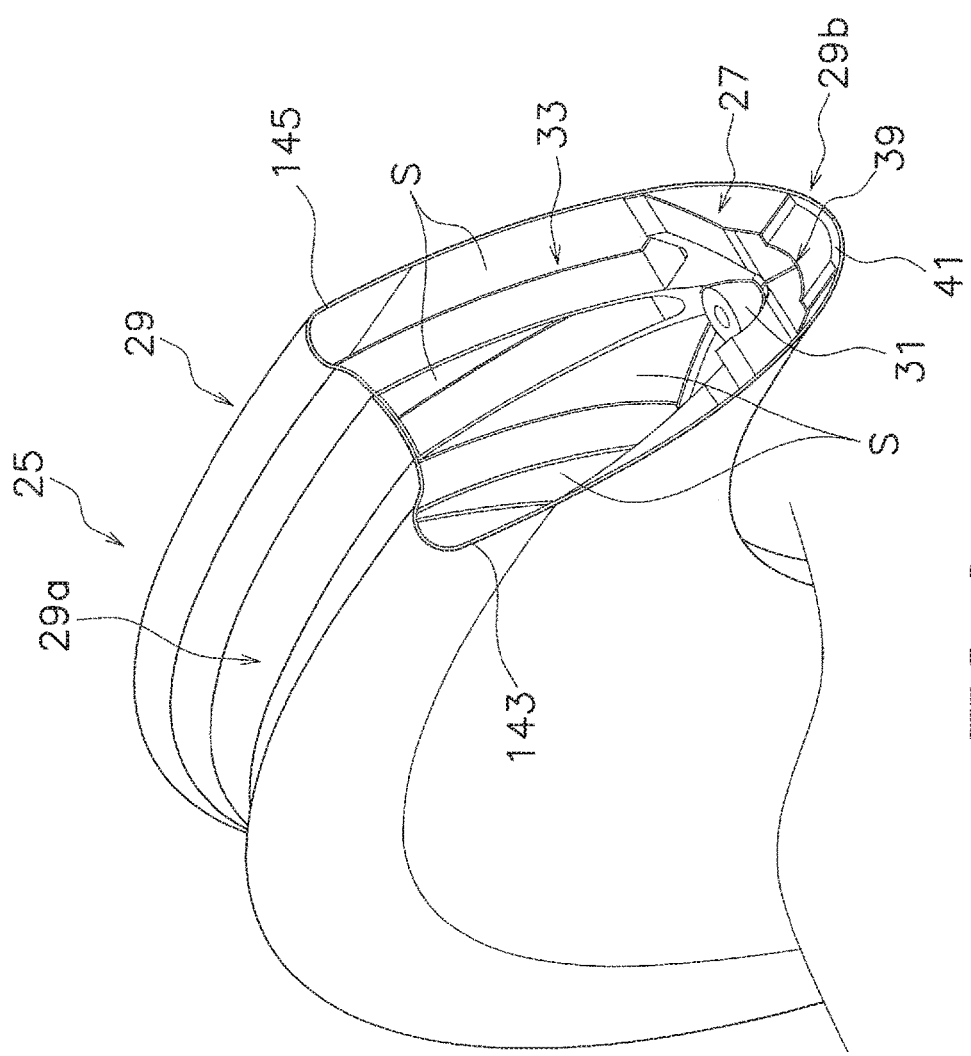

BICYCLE RIM

BACKGROUND

Technical Field

The technology disclosed herein relates to a bicycle rim.

Background Information

In recent years, various efforts have been made to not only reduce weight of bicycle members but also ensure stiffness of the bicycle members.

It is an object of the present invention to provide a bicycle rim capable of reducing weight thereof and ensuring sufficient stiffness thereof.

SUMMARY OF THE INVENTION

In accordance with a first aspect of the present invention, a bicycle rim comprises a base member, a cover member, and a spoke attachment member. The base member includes a truss structure that defines at least one opening. The cover member at least partly covers the at least one opening of the base member. The spoke attachment member is a separate member from the base member and the cover member. The spoke attachment member is non-rotatably attached to the base member.

With the bicycle rim according to the first aspect, the bicycle rim is capable of reducing weight thereof and ensuring sufficient stiffness thereof, because the bicycle rim comprises the base member including a truss structure, the cover member, and the spoke attachment member that is a separate member from the base member and the cover member.

In accordance with a second aspect of the present invention, the bicycle rim according to the first aspect is configured so that the truss structure includes at least one slanting member that intersects with a radial direction with respect to a rotational center axis of the bicycle rim.

With the bicycle rim according to the second aspect, the bicycle rim is capable of withstanding forces from multiple direction, because the truss structure includes at least one slanting member that intersects with a radial direction with respect to a rotational center axis of the bicycle rim. In other words, the bicycle rim is capable of reducing weight thereof and ensuring sufficient stiffness thereof.

In accordance with a third aspect of the present invention, the bicycle rim according to the second aspect is configured so that the truss structure further includes at least one radially extending member with respect to the rotational center axis.

With the bicycle rim according to the third aspect, the bicycle rim is capable of effectively withstanding forces from multiple direction, because the truss structure includes at least one radially extending member besides at least one slanting member. In other words, the bicycle rim is capable of reducing weight thereof and effectively ensuring sufficient stiffness thereof.

In accordance with a fourth aspect of the present invention, the bicycle rim according to any one of the first to third aspects is configured so that the truss structure includes a plurality of slanting members that intersect with a radial direction with respect to a rotational center axis of the bicycle rim.

With the bicycle rim according to the fourth aspect, the bicycle rim is capable of withstanding forces from multiple direction, because the truss structure includes a plurality of slanting members. In other words, the bicycle rim is capable of reducing weight thereof and ensuring sufficient stiffness thereof.

In accordance with a fifth aspect of the present invention, the bicycle rim according to the fourth aspect is configured so that the truss structure further includes a plurality of radially extending members with respect to the rotational center axis.

With the bicycle rim according to the fifth aspect, the bicycle rim is capable of effectively withstanding forces from multiple direction, because the truss structure includes a plurality of radially extending members besides at least one slanting member. In other words, the bicycle rim is capable of reducing weight thereof and effectively ensuring sufficient stiffness thereof.

In accordance with a sixth aspect of the present invention, the bicycle rim according to any one of the first to fifth aspects is configured so that the truss structure defines a plurality of openings.

With the bicycle rim according to the sixth aspect, the bicycle rim is capable of realizing further weight reduction thereof.

In accordance with a seventh aspect of the present invention, the bicycle rim according to any one of the first to sixth aspects is configured so that the base member has a radially outer peripheral part and a radially inner peripheral part. The spoke attachment member is attached to the radially inner peripheral part of the base member.

With the bicycle rim according to the seventh aspect, the bicycle rim is capable of realizing further weight reduction thereof, because it is possible to avoid lengthening a total length of a spoke by the above configuration.

In accordance with a eighth aspect of the present invention, the bicycle rim according to any one of the first to seventh aspects is configured so that the cover member has a radially outer peripheral part and a radially inner peripheral part. The spoke attachment member is attached to the radially inner peripheral part of the cover member.

With the bicycle rim according to the eighth aspect, the bicycle rim is capable of realizing further weight reduction thereof, because it is possible to avoid lengthening a total length of a spoke by the above configuration.

In accordance with a ninth aspect of the present invention, the bicycle rim according to any one of the first to eighth aspects is configured so that the truss structure includes a pair of slanting members that intersect with a radial direction with respect to a rotational center axis of the bicycle rim, and a junction joining the pair of slanting members.

With the bicycle rim according to the ninth aspect, the bicycle rim is capable of improving stiffness thereof, because the truss structure includes a pair of slanting members and a junction.

In accordance with a tenth aspect of the present invention, the bicycle rim according to the ninth aspect is configured so that the spoke attachment member is attached to the junction.

With the bicycle rim according to the tenth aspect, the bicycle rim is capable of improving stiffness thereof.

In accordance with an eleventh aspect of the present invention, the bicycle rim according to the ninth or tenth aspect is configured so that the truss structure includes a radially extending member with respect to the rotational center axis. The junction joins the pair of slanting members and the radially extending member.

With the bicycle rim according to the eleventh aspect, the bicycle rim is capable of improving stiffness thereof.

In accordance with a twelfth aspect of the present invention, the bicycle rim according to any one of the first to eleventh aspects is configured so that the cover member completely covers the at least one opening of the base member.

With the bicycle rim according to the twelfth aspect, the bicycle rim is capable of improving an aerodynamic characteristic thereof.

In accordance with a thirteenth aspect of the present invention, the bicycle rim according to any one of the first to twelfth aspects is configured so that the cover member completely covers the plurality of openings of the base member.

With the bicycle rim according to the thirteenth aspect, the bicycle rim is capable of improving an aerodynamic characteristic thereof.

In accordance with a fourteenth aspect of the present invention, the bicycle rim according to any one of the first to thirteenth aspects is configured so that the base member is made of a non-metallic material.

With the bicycle rim according to the fourteenth aspect, the bicycle rim is capable of realizing weight reduction thereof.

In accordance with a fifteenth aspect of the present invention, the bicycle rim according to the fourteenth aspect is configured so that the base member is made of a fiber-reinforced plastic.

With the bicycle rim according to the fifteenth aspect, the bicycle rim is capable of realizing weight reduction thereof and ensuring sufficient stiffness thereof.

In accordance with a sixteenth aspect of the present invention, the bicycle rim according to the fourteenth aspect is configured so that the truss structure of the base member is formed by injection molding.

With the bicycle rim according to the sixteenth aspect, productivity of the bicycle rim can be improved.

In accordance with a seventeenth aspect of the present invention, the bicycle rim according to any one of the first to sixteenth aspects is configured so that the cover member is made of a metallic material.

With the bicycle rim according to the seventeenth aspect, the bicycle rim is capable of realizing weight reduction thereof and ensuring sufficient stiffness thereof.

In accordance with an eighteenth aspect of the present invention, the bicycle rim according to the seventeenth aspect is configured so that the cover member is made of aluminum.

With the bicycle rim according to the eighteenth aspect, the bicycle rim is capable of realizing weight reduction thereof and ensuring sufficient stiffness thereof.

In accordance with a nineteenth aspect of the present invention, the bicycle rim according to any one of the first to eighteenth aspects is configured so that the spoke attachment member is made of a metallic material.

With the bicycle rim according to the nineteenth aspect, the bicycle rim is capable of realizing weight reduction thereof and ensuring sufficient stiffness thereof.

In accordance with a twentieth aspect of the present invention, the bicycle rim according to the nineteenth aspect is configured so that the spoke attachment member is made of aluminum.

With the bicycle rim according to the twentieth aspect, the bicycle rim is capable of realizing weight reduction thereof and ensuring sufficient stiffness thereof.

In accordance with a twenty first aspect of the present invention, the bicycle rim according to the nineteenth or twentieth aspect is configured so that the spoke attachment member is shaped by forging.

With the bicycle rim according to the twenty first aspect, productivity of the bicycle rim can be improved.

In accordance with a twenty second aspect of the present invention, the bicycle rim according to any one of the first to twenty first aspects is configured so that the spoke attachment member includes a tubular portion and a projecting portion extending from the tubular portion.

With the bicycle rim according to the twenty second aspect, rotation of the spoke attachment member is effectively restricted by the above configuration.

In accordance with a twenty third aspect of the present invention, the bicycle rim according to any one of the first to twenty second aspects is configured so that the base member has a first wear-resistance. The cover member has a second wear-resistance that is larger than the first wear-resistance. The spoke attachment member has a third wear-resistance that is larger than the first wear-resistance.

With the bicycle rim according to the twenty third aspect, the bicycle rim is capable of ensuring sufficient wear resistant thereof and realizing weight reduction thereof.

In accordance with a twenty fourth aspect of the present invention, the bicycle rim according to any one of the first to twenty third aspects is configured so that the base member has a first specific gravity. The cover member has a second specific gravity that is larger than the first specific gravity. The spoke attachment member has a third specific gravity that is larger than the first specific gravity.

With the bicycle rim according to the twenty fourth aspect, the bicycle rim is capable of ensuring sufficient stiffness thereof and realizing weight reduction thereof.

In accordance with a twenty fifth aspect of the present invention, the bicycle rim according to any one of the first to twenty fourth aspects is configured so that the cover member includes a first cover portion and a second cover portion. The first cover portion is attached to the second cover portion in a state where the bicycle rim is assembled.

With the bicycle rim according to the twenty fifth aspect, productivity of the bicycle rim can be improved.

In accordance with a twenty sixth aspect of the present invention, the bicycle rim according to any one of the first to twenty fifth aspects is configured so that the base member includes an annular truss structure that defines a plurality of openings.

With the bicycle rim according to the twenty sixth aspect, the bicycle rim is capable of reducing weight thereof and ensuring sufficient stiffness thereof.

In accordance with a twenty seventh aspect of the present invention, the bicycle rim according to any one of the first to twenty sixth aspects is configured so that the cover member has an annular shape.

With the bicycle rim according to the twenty seventh aspect, the bicycle rim is capable of reducing weight thereof and ensuring sufficient stiffness thereof.

In accordance with a twenty eighth aspect of the present invention, a bicycle rim comprises an annular base member, a cover member, and a spoke attachment member. The annular base member has at least one opening. The cover member at least partly covers the at least one opening of the base member. The spoke attachment member is a separate member from the base member and the cover member. The spoke attachment member is non-rotatably attached to the base member.

With the bicycle rim according to the twenty eighth aspect, the bicycle rim is capable of reducing weight thereof and ensuring sufficient stiffness thereof, because the bicycle rim comprises the annular base member having at least one opening, the cover member, and the spoke attachment member that is a separate member from the base member and the cover member.

In accordance with a twenty ninth aspect of the present invention, the bicycle rim according to the twenty eighth aspect is configured so that the annular base member includes at least one slanting member that intersects with a radial direction with respect to a rotational center axis of the bicycle rim.

With the bicycle rim according to the twenty ninth aspect, the bicycle rim is capable of withstanding forces from multiple direction, because the annular base member includes at least one slanting member that intersects with a radial direction with respect to a rotational center axis of the bicycle rim. In other words, the bicycle rim is capable of reducing weight thereof and ensuring sufficient stiffness thereof.

In accordance with a thirtieth aspect of the present invention, the bicycle rim according to the twenty eighth or twenty ninth aspect is configured so that the annular base member further includes at least one radially extending member with respect to the rotational center axis.

With the bicycle rim according to the thirtieth aspect, the bicycle rim is capable of effectively withstanding forces from multiple direction, because the annular base member includes at least one radially extending member besides at least one slanting member. In other words, the bicycle rim is capable of reducing weight thereof and effectively ensuring sufficient stiffness thereof.

In accordance with a thirty first aspect of the present invention, the bicycle rim according to any one of the twenty eighth to thirtieth aspects is configured so that the annular base member includes a plurality of slanting members that intersect with a radial direction with respect to a rotational center axis of the bicycle rim.

With the bicycle rim according to the thirty first aspect, the bicycle rim is capable of withstanding forces from multiple direction, because the annular base member includes a plurality of slanting members. In other words, the bicycle rim is capable of reducing weight thereof and ensuring sufficient stiffness thereof.

In accordance with a thirty second aspect of the present invention, the bicycle rim according to the thirty first aspect is configured so that the annular base member further includes a plurality of radially extending members with respect to the rotational center axis.

With the bicycle rim according to the thirty second aspect, the bicycle rim is capable of effectively withstanding forces from multiple direction, because the annular base member includes at least one slanting member and the plurality of radially extending members. In other words, the bicycle rim is capable of reducing weight thereof and effectively ensuring sufficient stiffness thereof.

In accordance with a thirty third aspect of the present invention, the bicycle rim according to any one of the twenty eighth to thirty second aspects is configured so that the annular base member has a plurality of openings.

With the bicycle rim according to the thirty third aspect, the bicycle rim is capable of realizing further weight reduction thereof.

In accordance with a thirty fourth aspect of the present invention, the bicycle rim according to any one of the twenty eighth to thirty third aspects is configured so that the cover member completely covers the at least one opening of the annular base member.

With the bicycle rim according to the thirty fourth aspect, the bicycle rim is capable of improving an aerodynamic characteristic thereof.

In accordance with a thirty fifth aspect of the present invention, the bicycle rim according to any one of the twenty eighth to thirty fourth aspects is configured so that the cover member completely covers the plurality of openings of the annular base member.

With the bicycle rim according to the thirty fifth aspect, the bicycle rim is capable of improving an aerodynamic characteristic thereof.

In accordance with a thirty sixth aspect of the present invention, the bicycle rim according to any one of the twenty eighth to thirty fifth aspects is configured so that the annular base member has a radially outer peripheral part and a radially inner peripheral part. The spoke attachment member is attached to the radially inner peripheral part of the annular base member.

With the bicycle rim according to the thirty sixth aspect, the bicycle rim is capable of realizing further weight reduction thereof, because it is possible to avoid lengthening a total length of a spoke by the above configuration.

In accordance with a thirty seventh aspect of the present invention, the bicycle rim according to any one of the twenty eighth to thirty sixth aspects is configured so that the cover member has a radially outer peripheral part and a radially inner peripheral part. The spoke attachment member is attached to the radially inner peripheral part of the cover member.

With the bicycle rim according to the thirty seventh aspect, the bicycle rim is capable of realizing further weight reduction thereof, because it is possible to avoid lengthening a total length of a spoke by the above configuration.

In accordance with a thirty eighth aspect of the present invention, the bicycle rim according to any one of the twenty eighth to thirty seventh aspects is configured so that the annular base member includes a pair of slanting members that intersect with a radial direction with respect to a rotational center axis of the bicycle rim, and a junction joining the pair of slanting members.

With the bicycle rim according to the thirty eighth aspect, the bicycle rim is capable of improving stiffness thereof, because the annular base member includes a pair of slanting members and a junction.

In accordance with a thirty ninth aspect of the present invention, the bicycle rim according to the thirty eighth aspect is configured so that the spoke attachment member is attached to the junction.

With the bicycle rim according to the thirty ninth aspect, the bicycle rim is capable of improving stiffness thereof.

In accordance with a fortieth aspect of the present invention, the bicycle rim according to the thirty eighth or thirty ninth aspect is configured so that the annular base member includes a radially extending member with respect to the rotational center axis. The junction joins the pair of slanting members and the radially extending member.

With the bicycle rim according to the fortieth aspect, the bicycle rim is capable of improving stiffness thereof.

In accordance with a forty first aspect of the present invention, the bicycle rim according to any one of the twenty eighth to fortieth aspects is configured so that the annular base member is made of a non-metallic material.

With the bicycle rim according to the forty first aspect, the bicycle rim is capable of realizing weight reduction thereof.

In accordance with a forty second aspect of the present invention, the bicycle rim according to any one of the twenty eighth to forty first aspects is configured so that the annular base member is made of a fiber-reinforced plastic.

With the bicycle rim according to the forty second aspect, the bicycle rim is capable of realizing weight reduction thereof and ensuring sufficient stiffness thereof.

In accordance with a forty third aspect of the present invention, the bicycle rim according to any one of the twenty eighth to forty second aspects is configured so that the cover member is made of a metallic material.

With the bicycle rim according to the forty third aspect, the bicycle rim is capable of realizing weight reduction thereof and ensuring sufficient stiffness thereof.

In accordance with a forty fourth aspect of the present invention, the bicycle rim according to any one of the twenty eighth to forty third aspects is configured so that the cover member is made of aluminum.

With the bicycle rim according to the forty fourth aspect, the bicycle rim is capable of realizing weight reduction thereof and ensuring sufficient stiffness thereof.

In accordance with a forty fifth aspect of the present invention, the bicycle rim according to any one of the twenty eighth to forty forth aspects is configured so that the spoke attachment member is made of a metallic material.

With the bicycle rim according to the forty fifth aspect, the bicycle rim is capable of realizing weight reduction thereof and ensuring sufficient stiffness thereof.

In accordance with a forty sixth aspect of the present invention, the bicycle rim according to any one of the twenty eighth to forty fifth aspects is configured so that the spoke attachment member is made of aluminum.

With the bicycle rim according to the forty sixth aspect, the bicycle rim is capable of realizing weight reduction thereof and ensuring sufficient stiffness thereof.

In accordance with a forty seventh aspect of the present invention, the bicycle rim according to any one of the twenty eighth to forty sixth aspects is configured so that the spoke attachment member includes a tubular portion and a projecting portion extending from the tubular portion.

With the bicycle rim according to the forty seventh aspect, rotation of the spoke attachment member is effectively restricted by the above configuration.

In accordance with a forty eighth aspect of the present invention, the bicycle rim according to any one of the twenty eighth to forty seventh aspects is configured so that the annular base member has a first wear-resistance. The cover member has a second wear-resistance that is larger than the first wear-resistance. The spoke attachment member has a third wear-resistance that is larger than the first wear-resistance.

With the bicycle rim according to the forty eighth aspect, the bicycle rim is capable of ensuring sufficient wear resistant thereof and realizing weight reduction thereof.

In accordance with a forty ninth aspect of the present invention, the bicycle rim according to any one of the twenty eighth to forty eighth aspects is configured so that the annular base member has a first specific gravity. The cover member has a second specific gravity that is larger than the first specific gravity. The spoke attachment member has a third specific gravity that is larger than the first specific gravity.

With the bicycle rim according to the forty ninth aspect, the bicycle rim is capable of ensuring sufficient stiffness thereof and realizing weight reduction thereof.

BRIEF DESCRIPTION OF THE DRAWINGS

Referring now to the attached drawings, which form a part of this original disclosure:

FIG. 9 is a partially enlarged cross-sectional view of the bicycle rim according to the other embodiment.

DETAILED DESCRIPTION OF PREFERRED EMBODIMENTS

Selected embodiments of the present technology will now be explained with reference to the drawings. It will be apparent to those skilled in the art from this disclosure that the following descriptions of the embodiments of the present technology are provided for illustration only and not for the purpose of limiting the technology as defined by the appended claims and their equivalents.

Embodiment

Figure 1:
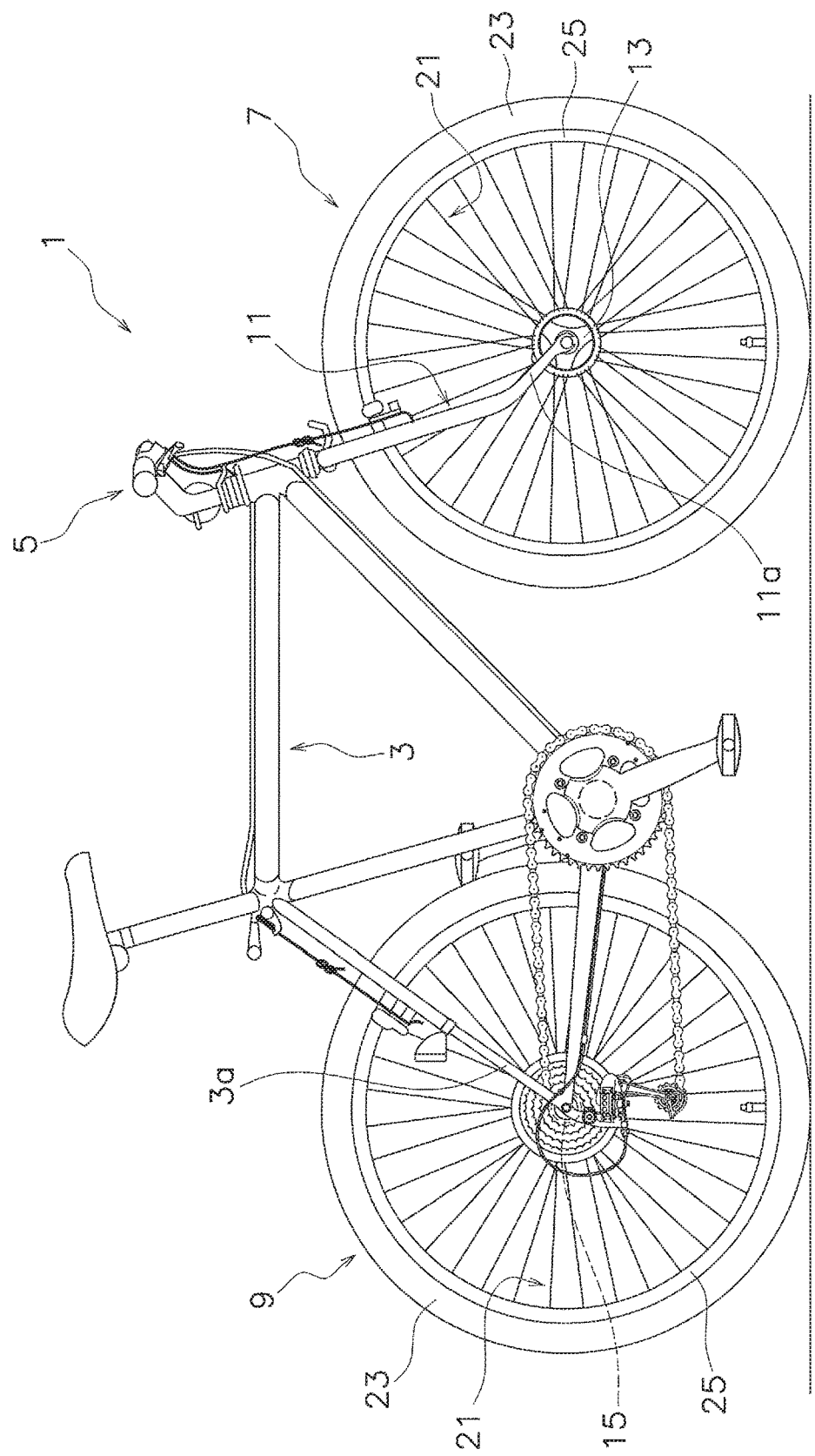
FIG. 1 is a side view of a bicycle according to an embodiment of the present invention.

As shown FIG. 1, a bicycle 1 includes a frame 3, a handle 5, front and rear wheels 7, 9. The handle 5 is fixed to a front fork 11 which is rotatably attached to the frame 3. The front wheel 7 is rotatably attached to a pair of end portions 11a of the front fork 11 via a front hub assembly 13. The rear wheel 9 is rotatably attached to a pair of rear end portions 3a of the frame 3 via a rear hub assembly 15.

Each of the front and rear wheels 7, 9 includes a plurality of spokes 21 and a bicycle rim 25. A bicycle tire 23 is configured to be attached to the bicycle rim 25. The plurality of spokes 21 of the front wheel 7 connect the bicycle rim 25 to the front hub assembly 13. The plurality of spokes 21 of the rear wheel 9 connect the bicycle rim 25 to the rear hub assembly 15. The bicycle tire 23 is a separate member from the bicycle rim 25.

<Bicycle Rim>

Figure 2:
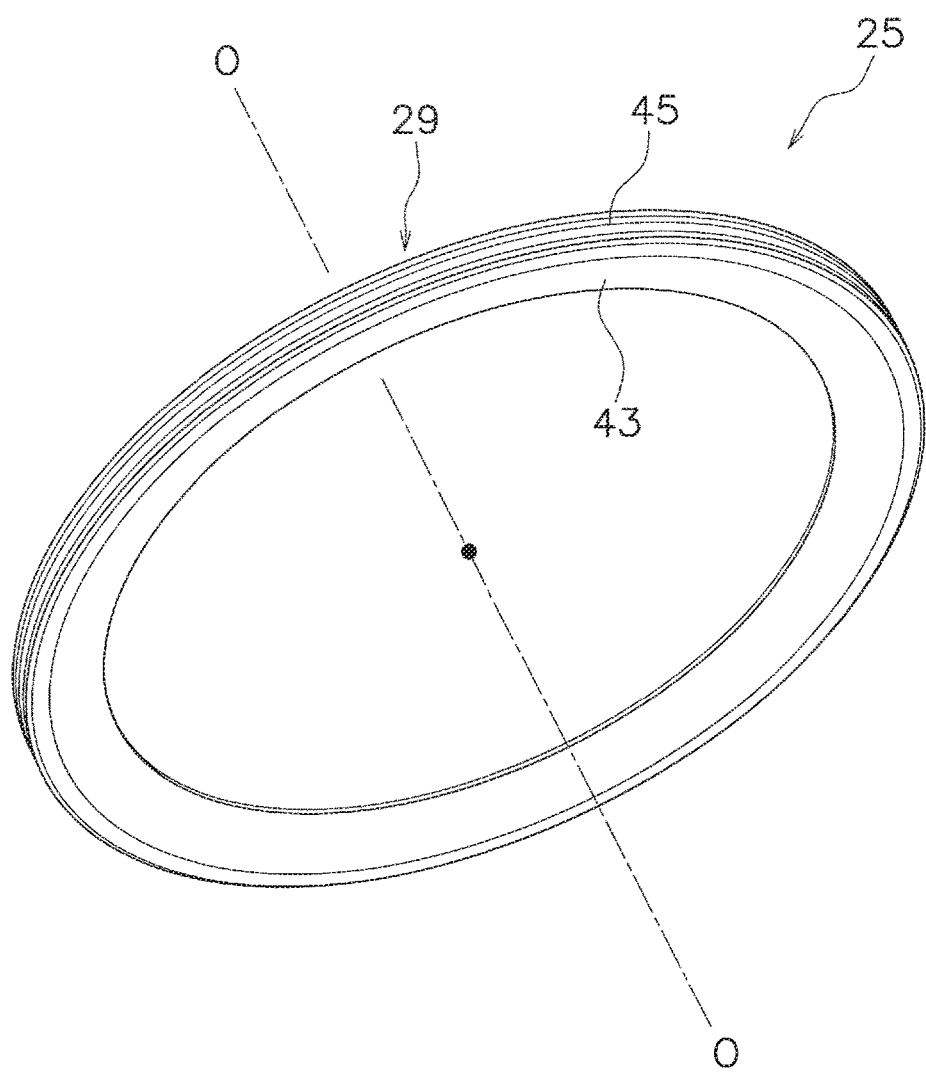
FIG. 2 is a perspective view of a bicycle rim according to the embodiment.
Figure 3:
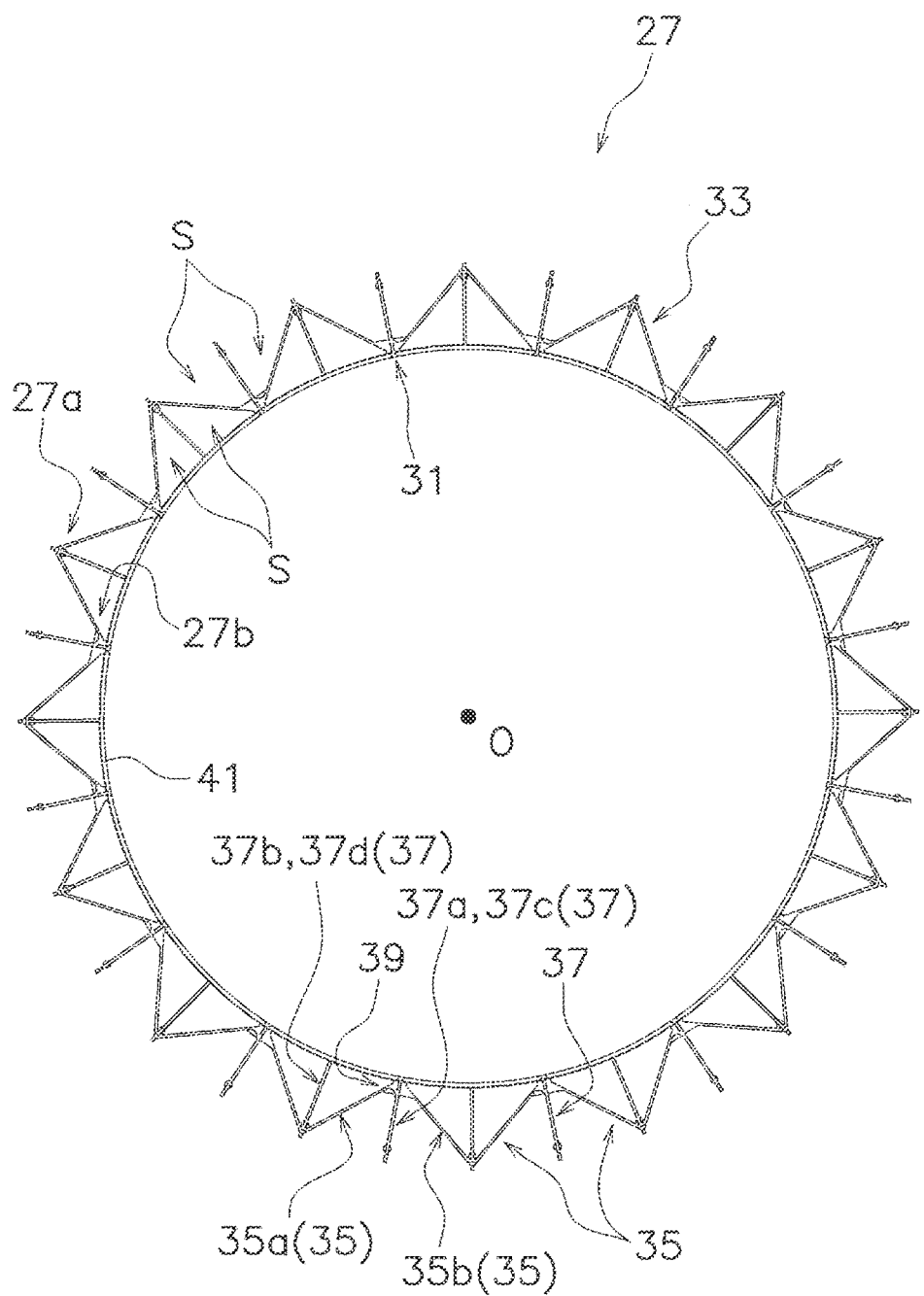
FIG. 3 is a side view of a base member of the bicycle rim according to the embodiment.
Figure 4:
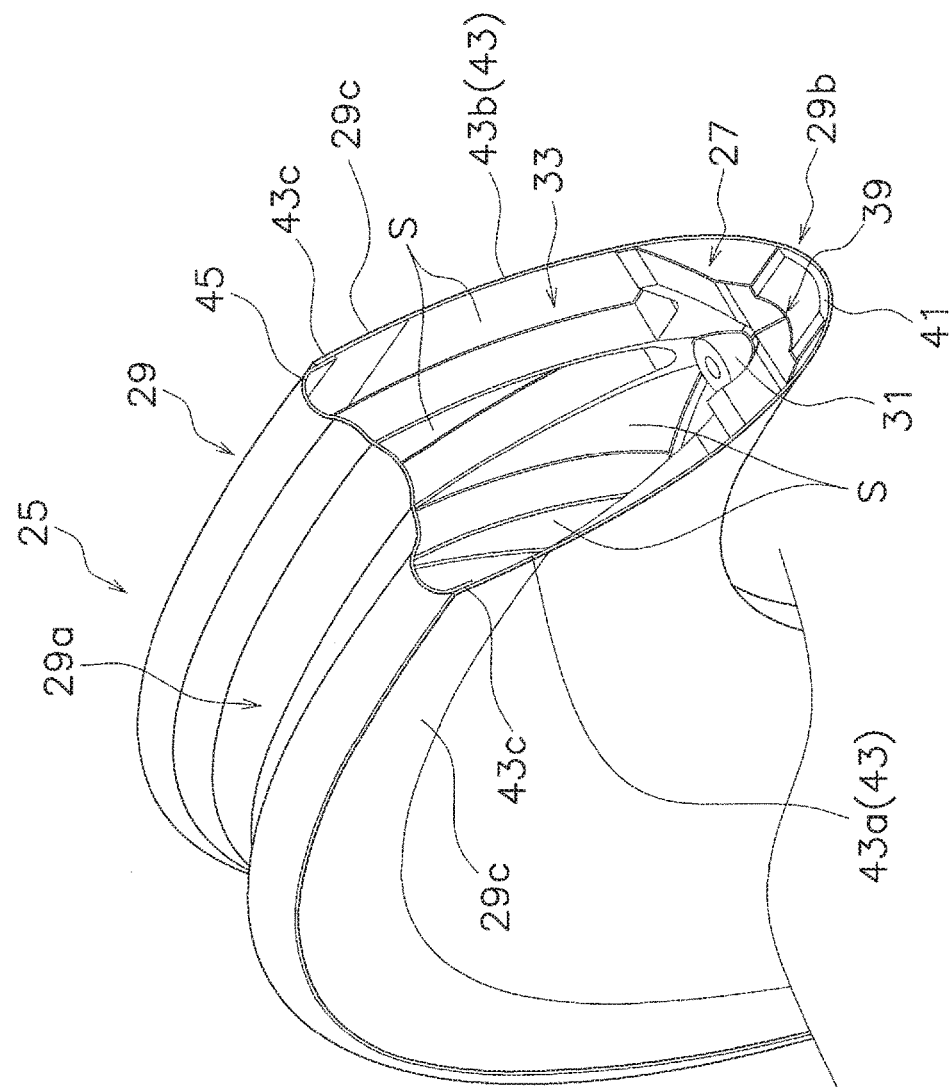
FIG. 4 is a partially enlarged cross-sectional view of the bicycle rim according to the embodiment.

As shown in FIGS. 2 to 4, the bicycle rim 25 comprises the base member 27, the cover member 29, and the spoke attachment member 31. The base member 27 preferably includes a truss structure 33 that defines the at least one opening S. More preferably, the base member 27 may include an annular truss structure 33 that defines a plurality of openings S. The cover member 29 at least partly covers the at least one opening S of the base member 27. The spoke attachment member 31 is a separate member from the base member 27 and the cover member 29. The spoke attachment member 31 is non-rotatably attached to the base member 27.

The base member 27 may preferably have an annular shape so that the bicycle rim 25 comprises an annular base member 27, a cover member 29, and a spoke attachment member 31. The annular base member 27 has at least one opening S. The cover member 29 at least partly covers the at least one opening S of the annular base member 27. The spoke attachment member 31 is a separate member from the annular base member 27 and the cover member 29. The spoke attachment member 31 is non-rotatably attached to the annular base member 27. For the sake of brevity, hereinafter, the term "base member" also means an annular base member. Thus, the base member 27 can be an example of an annular base member so that the term "base member 27" is interchangeable with the term "annular base member 27".

—Base Member—

As shown in FIGS. 3 and 4, the base member 27 is formed in a substantially annular shape. The base member 27 defines the at least one opening S. Thus, the base member 27 may have the at least one opening S.

In the embodiment, the base member 27 includes the truss structure 33 that defines the at least one opening S. Specifically, the base member 27 includes the truss structure 33 that defines a plurality of openings S. In other words, the base member 27 may have a plurality of openings S. At least part of each of the plurality of openings S is provided on a radially outside from the spoke attachment member 31.

Figure 5:
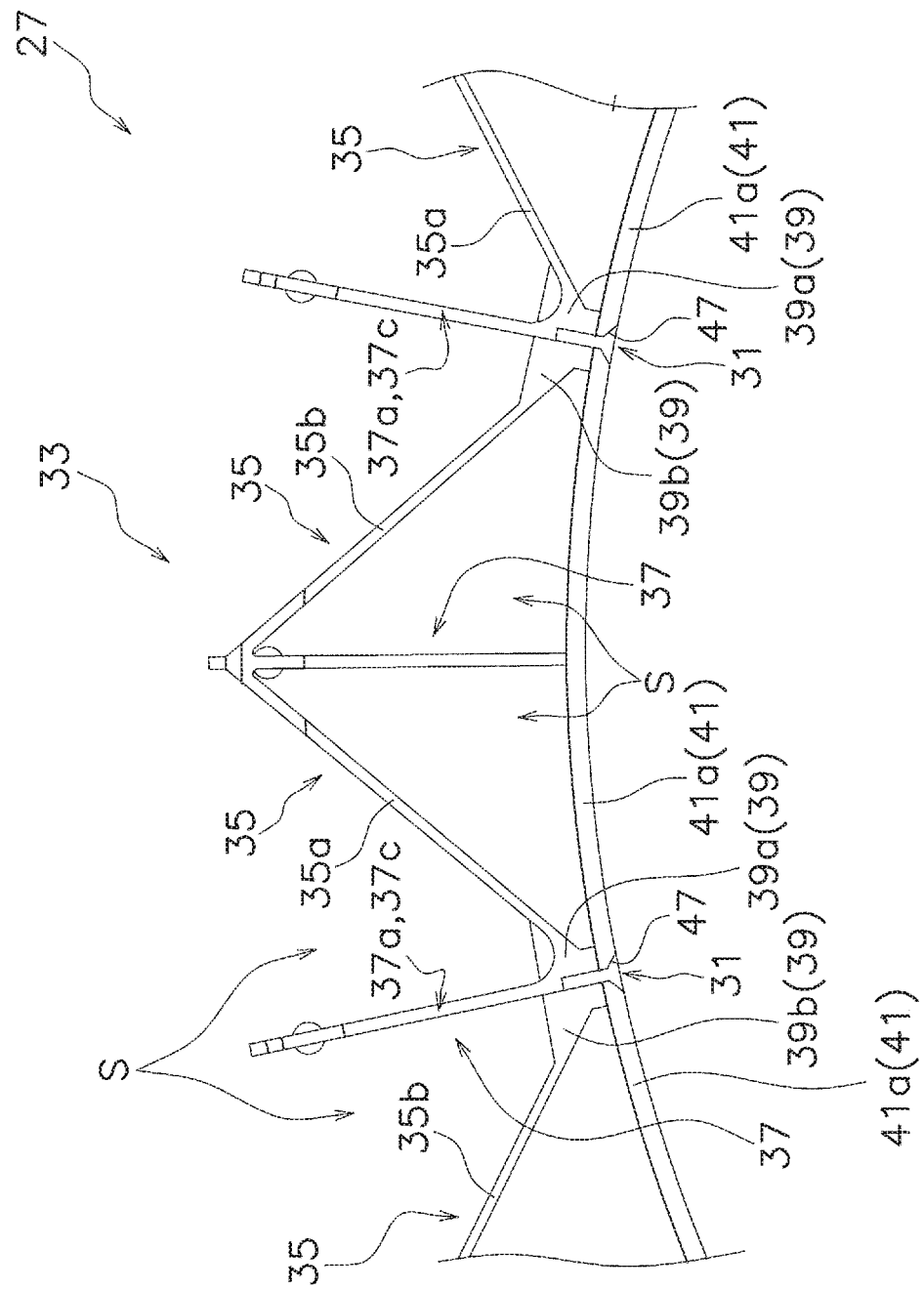
FIG. 5 is a partially enlarged side view of a truss structure according to the embodiment.

As shown in FIGS. 3 and 5, the truss structure 33 is formed in a substantially annular shape. The truss structure 33 preferably includes at least one slanting member 35 that intersects with a radial direction with respect to a rotational center axis O of the bicycle rim 25. Preferably, the truss structure 33 further includes at least one radially extending member 37 with respect to the rotational center axis O. The base member 27 may include at least one slanting member 35 that intersects with a radial direction with respect to a rotational center axis O of the bicycle rim 25. Preferably, the base member 27 may further include at least one radially extending member 37 with respect to the rotational center axis O.

The truss structure 33 preferably includes a plurality of the slanting members 35 that intersect with the radial direction with respect to the rotational center axis O of the bicycle rim 25. Preferably, the truss structure 33 further includes a plurality of the radially extending members 37 with respect to the rotational center axis O. The base member 27 may include a plurality of the slanting members 35 that intersect with the radial direction with respect to the rotational center axis O of the bicycle rim 25. Preferably, the base member 27 may further include a plurality of the radially extending members 37 with respect to the rotational center axis O.

The truss structure 33 includes a pair of the slanting members 35a, 35b that intersect with the radial direction with respect to the rotational center axis O of the bicycle rim 25, and a junction 39 joining the pair of slanting members 35a, 35b.

Figure 6:
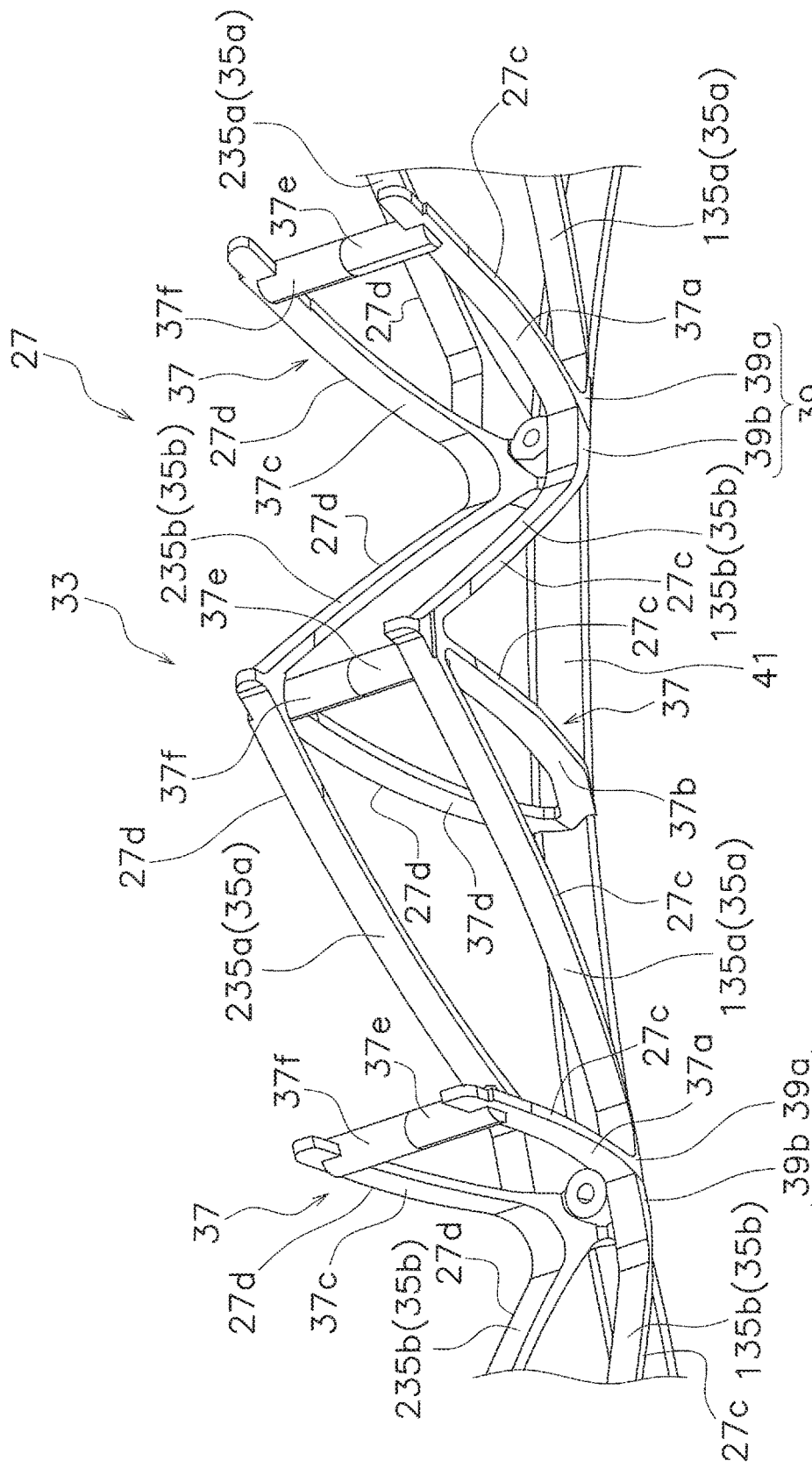
FIG. 6 is a partially enlarged perspective view of the truss structure according to the embodiment.

In the embodiment, as shown in FIG. 6, the truss structure 33 includes a plurality of first and second pairs of the slanting members 135a, 135b, 235a, 235b, the plurality of the radially extending members 37, and a plurality of the junctions 39. The truss structure may further include an inner periphery member 41.

—Slanting Member—

As shown in FIG. 6, the plurality of first pairs of slanting members 135a, 135b are arranged side by side in a circumferential direction with respect to the rotational center axis O.

The first pair of slanting members 135a, 135b includes a first slanting member 135a and a second slanting member 135b. The first slanting member 135a and the second slanting member 135b are arranged adjacent to each other in the circumferential direction.

The first slanting member 135a extends radially outside from the junction 39 with an inclination. A radially inner portion of the first slanting member 135a is attached to the junction 39. A radially outer portion of the first slanting member 135a is attached to a radially outer portion of the second slanting member 135b.

The second slanting member 135b extends radially outside from the junction 39 with an inclination. A radially inner portion of the second slanting member 135b is attached to the junction 39. A radially outer portion of the second slanting member 135b is attached to the radially outer portion of the first slanting member 135a.

The plurality of second pairs of slanting members 235a, 235b are arranged side by side in the circumferential direction. The plurality of second pairs of slanting members 235a, 235b are arranged at an interval with the plurality of first pairs of slanting members 135a, 135b in an axial direction parallel to the rotational center axis O.

The second pair of slanting members 235a, 235b includes a third slanting member 235a and a fourth slanting member 235b. The third slanting member 235a and the fourth slanting member 235b are arranged adjacent to each other in the circumferential direction.

The third slanting member 235a is arranged opposed to the first slanting member 135a in the axial direction. The third slanting member 235a extends radially outside from the junction 39 with an inclination. A radially inner portion of the third slanting member 235a is attached to the junction 39. A radially outer portion of the third slanting member 235a is attached to a radially outer portion of the fourth slanting member 235b as illustrated in FIG. 6.

The fourth slanting member 235b is arranged opposed to the second slanting member 135b in the axial direction. The fourth slanting member 235b extends radially outside from the junction 39 with an inclination. A radially inner portion of the fourth slanting member 235b is attached to the junction 39. A radially outer portion of the fourth slanting member 235b is attached to a radially outer portion of the third slanting member 235a.

—Radially Extending Member—

As shown in FIGS. 3, 5, and 6 the plurality of radially extending members 37 extend along the radial direction with respect to the rotational center axis O. The plurality of radially extending members 37 include a plurality of first radially extending members 37a, a plurality of second radially extending members 37b, a plurality of third radially extending members 37c, and a plurality of fourth radially extending members 37d.

As shown in FIG. 6, the plurality of first radially extending members 37a are arranged at an interval apart from each other in the circumferential direction. Each of the first radially extending members 37a is arranged between the first slanting member 135a and the second slanting member 135b in the circumferential direction.

A radially inner portion of each of the plurality of the first radially extending members 37a is attached to the junction 39. Each of the first radially extending members 37a extends radially outside from the junction 39.

The plurality of second radially extending members 37b are arranged at an interval apart from each other in the circumferential direction. Each of the second radially extending members 37b is arranged between the adjacent first radially extending members 37a in the circumferential direction.

A radially outer portion of each of the plurality of the second radially extending members 37b is attached to the radially outer portions of the first slanting member 135a and the second slanting member 135b. Each of the second radially extending members 37b extends radially inside from the radially outer portions of the first slanting member 135a and the second slanting member 135b.

Each of the plurality of third radially extending members 37c is arranged opposed to the first radially extending member 37a in the axial direction. The plurality of third radially extending members 37c are arranged at an interval apart from each other in the circumferential direction.

A radially inner portion of each of the plurality of the third radially extending members 37c is attached to the junction 39. Each of the third radially extending members 37c is arranged between the third slanting member 235a and the fourth slanting member 235b in the circumferential direction.

Each of the plurality of fourth radially extending members 37d is arranged opposed to the second radially extending member 37b in the axial direction. The plurality of fourth radially extending members 37d are arranged at an interval apart from each other in the circumferential direction.

A radially outer portion of each of the plurality of fourth radially extending members 37d is attached to the radially outer portions of the third slanting member 235a and the fourth slanting member 235b. Each of the fourth radially extending members 37d is arranged between the third slanting member 235a and the fourth slanting member 235b in the circumferential direction.

As shown in FIG. 6, a first spacing portion 37e is formed on each of the first radially extending member 37a and the second radially extending member 37b. The first spacing portion 37e of the first radially extending member 37a projects toward the third radially extending member 37c in the axial direction. The first spacing portion 37e of the second radially extending member 37b projects toward the fourth radially extending member 37d in the axial direction.

A second spacing portion 37f is formed on each of the third radially extending member 37c and the fourth radially extending member 37d. The second spacing portion 37f of the third radially extending member 37c projects toward the first radially extending member 37a in the axial direction. The second spacing portion 37f of the fourth radially extending member 37d projects toward the second radially extending member 37b in the axial direction.

The first spacing portion 37e and the second spacing portion 37f are attached to each other. Specifically, the first spacing portion 37e and the second spacing portion 37f are fixed each other in a state where the first spacing portion 37e and the second spacing portion 37f abut on each other. In the embodiment, the first spacing portion 37e and the second spacing portion 37f are attached to each other by adhesive. Alternatively, the first spacing portion 37e and the second spacing portion 37f are attached to each other by a mechanical fastener, such as a rivet, a bolt, and so on.

An axially distance between the first radially extending member 37a and the third radially extending member 37c is held at a predetermined interval by the abutment of the first and second spacing portions 37e, 37f. Also, an axially distance between the second radially extending member 37b and the fourth radially extending member 37d is held at a predetermined interval by the abutment of the first and second spacing portions 37e, 37f.

—Junction—

As mentioned above, the truss structure 33 includes the pair of the slanting members 35a, 35b that intersect with the radial direction with respect to the rotational center axis O of the bicycle rim 25, and the junction 39 joining the pair of slanting members 35a, 35b. Preferably, the truss structure 33 further includes a radially extending member 37 with respect to the rotational center axis O. As shown in FIGS. 3 to 6, the junction 39 joins the pair of slanting members 35a, 35b and the radially extending member 37. The base member 27 may include the pair of the slanting members 35a, 35b that intersect with the radial direction with respect to the rotational center axis O of the bicycle rim 25, and the junction 39 joining the pair of slanting members 35a, 35b. Preferably, the base member 27 may further include a radially extending member 37 with respect to the rotational center axis O. The junction 39 joins the pair of slanting members 35a, 35b and the radially extending member 37.

In the embodiment, as shown in FIG. 6, each of the plurality of junctions 39 joins the first pair of the slanting members 135a, 135b and the second pair of slanting members 235a, 235b, and the radially extending members 37 (the first radially extending member 37a and the third radially extending members 37c).

Specifically, each of the junctions 39 includes a first junction portion 39a and a second junction portion 39b. The first junction portion 39a joins the first slanting member 135a, the third slanting member 235a, the first radially extending member 37a, and the third radially extending members 37c. The first junction portion 39a is provided on a radially inner portion of the first slanting member 135a, a radially inner portion of the third slanting member 235a, and a radially inner portion of the first radially extending member 37a.

The second junction portion 39b joins the second slanting member 135b and the fourth slanting member 235b. The second junction portion 39b is provided on a radially inner portion of the second slanting member 135b, a radially inner portion of the fourth slanting member 235b, and a radially inner portion of the third radially extending members 37c.

The second junction portion 39b is disposed adjacent to the first junction portion 39a in the circumferential direction. The second junction portion 39b is attached to the first junction portion 39a. For example, the second junction portion 39b is attached to the first junction portion 39a by adhesive.

—Inner Periphery Member—

As shown in FIG. 3, the inner periphery member 41 is formed in a substantially annular shape. The inner periphery member 41 is attached to the plurality of junction 39. The inner periphery member 41 may define the plurality of openings S with the slanting members 35 and the radially extending members 37.

As shown in FIG. 5, the inner periphery member 41 includes a plurality of arc portions 41a. Each of the plurality of arc portions 41a is formed in a substantially arc shape.

The plurality of arc portions 41a are arranged side by side in the circumferential direction on an inner peripheral side of the base member 27. Specifically, each of the plurality of arc portions 41a is arranged between the adjacent junctions 39 in the circumferential direction.

Each of the plurality of arc portions 41a is attached to the junctions 39. Also, each of the plurality of arc portions 41a is attached to the spoke attachment members 31.

In the embodiment, each of the plurality of arc portions 41a is attached to the first junction portion 39a, the second junction portion 39b, and the radially inner portions of the second radially extending member 37b and the fourth radially extending member 37d. The inner periphery member 41 may be integrally formed as a unitary one-piece member.

Basically, the plurality of openings S of the base member 27 are formed by at least one of the first to fourth slanting members 135a, 135b, 235a, 235b and at least one of the first to fourth radially extending members 37a, 37b, 37c, 37d. At least one of the arc portions 41a may form the plurality of openings S with at least one of the first to fourth slanting members 135a, 135b, 235a, 235b and at least one of the first to fourth radially extending members 37a, 37b, 37c, 37d.

Figure 7:
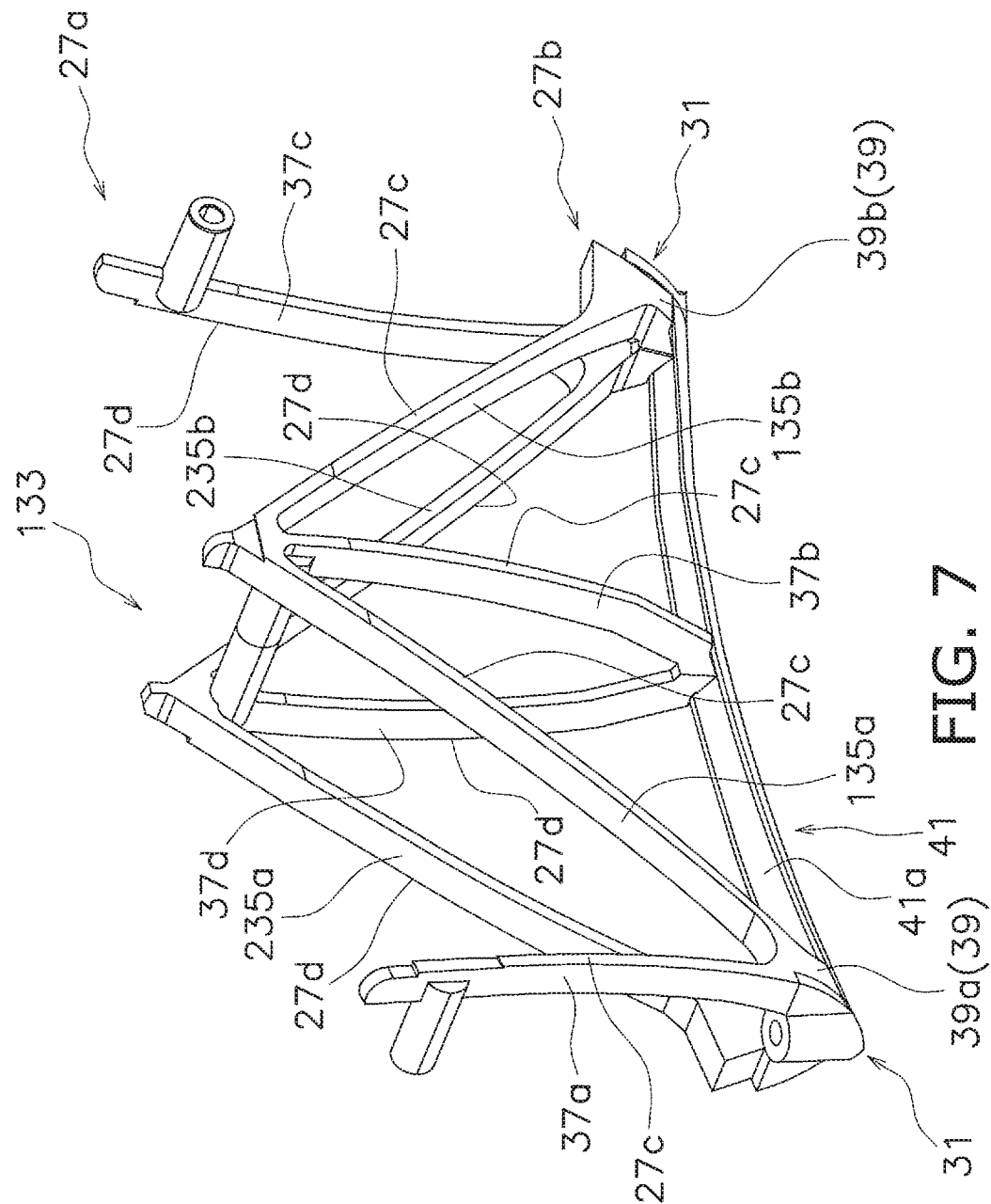
FIG. 7 is a perspective view of a truss unit of the truss structure according to the embodiment.

The truss structure 33 including the above configuration is assembled with a plurality of truss units 133, as shown in FIG. 7. Each of the plurality of truss units 133 includes the first pair of slanting members 135a, 135b (the first and second slanting members 135a, 135b), the second pair of slanting members 235a, 235b (the third and fourth slanting members 235a, 235b), the radially extending members 37 (the first to fourth radially extending members 37a, 37b, 37c, 37d), and the arc portion 41a. The truss structure 33 is formed by connecting the plurality of truss units 133 to each other in the circumferential direction. For example, the plurality of truss units 133 is attached to each other by adhesive. Alternatively, the plurality of truss units 133 may also be attached to each other by a mechanical fastener, such as a rivet, a bolt, and so on.

(Cover Member)

As shown in FIG. 2, the cover member 29 preferably has an annular shape.

Alternatively, the cover member 29 may have a non-annular shape. The cover member 29 is a separate member from the tire 23. The tire 23 is disposed on a radially outer side of the cover member 29 (see FIG. 1).

As shown in FIG. 4, the cover member 29 covers the truss structure 33 of the base member 27 from outside of the truss structure 33. Preferably, the cover member 29 completely covers the at least one opening S of the base member 27. Specifically, the cover member 29 completely covers the plurality of openings S of the base member 27.

As shown in FIG. 4, the cover member 29 has a radially outer peripheral part 29a and a radially inner peripheral part 29b. The radially inner peripheral part 29b is included in a first cover portion 43 (described as follows). The radially outer peripheral part 29a is included in a second cover portion 45 (described as follows).

The cover member 29 includes the first cover portion 43 and the second cover portion 45. The first cover portion 43 is attached to the second cover portion 45 in a state where the bicycle rim 25 is assembled.

In the embodiment, the cover member 29 includes a pair of the first cover portions 43a, 43b and the second cover portion 45. The pair of first cover portions 43a, 43b are attached to the second cover portion 45 in a state where the bicycle rim 25 is assembled.

The pair of first cover portions 43a, 43b are formed in a substantially annular shape. One of the pair of first cover portion 43a, 43b is arranged opposed to the other of the pair of first cover portion 43a, 43b in the axial direction.

One of the pair of first cover portions 43a, 43b, for example, the first cover portions 43a, is attached to the inner periphery member 41 (the plurality of arc portions 41a) and a first side portion 27c (see FIGS. 6 and 7) of the base member 27. The first side portion 27c of the base member 27 is formed by the plurality of first pairs of slanting members 135a, 135b (the first slanting members 135a and the second slanting members 135b), the first radially extending members 37a, and the second radially extending members 37b (see FIGS. 6 and 7).

The other of the pair of first cover portion 43a, 43b, for example, the first cover portions 43b, is attached to the inner periphery member 41 (the plurality of arc portions 41a) and a second side portion 27d (see FIGS. 6 and 7) of the base member 27. The second side portion 27d is formed by the plurality of second pairs of slanting members 235a, 235b (the third slanting members 235a and the fourth slanting members 235b), the third radially extending members 37c, and the fourth radially extending members 37d (see FIGS. 6 and 7).

The inner circumference portion of the pair of first cover portions 43a, 43b forms the radially inner peripheral part 29b of the cover member 29. The spoke attachment member 31 is attached to the radially inner peripheral part 29b. Specifically, each of the spoke attachment members 31 is attached to the radially inner peripheral part 29b. For example, each of the spoke attachment members 31 is attached to hollow portion 47 provided on the pair of first cover portions 43a, 43b (see FIG. 5).

The second cover portion 45 is formed in a substantially annular shape. The second cover portion 45 is attached to a radially outer portion of the base member 27. Specifically, the second cover portion 45 is attached to the radially outer portion of the truss structure 33 and radially outer portions 43c of the pair of first cover portions 43a, 43b.

The outer circumference portion of the second cover portion 45 forms the radially outer peripheral part 29a of the cover member 29. The tire 23 is disposed on the radially outer peripheral part 29a of the cover member 29.

—Spoke Attachment Member—

Figure 8:
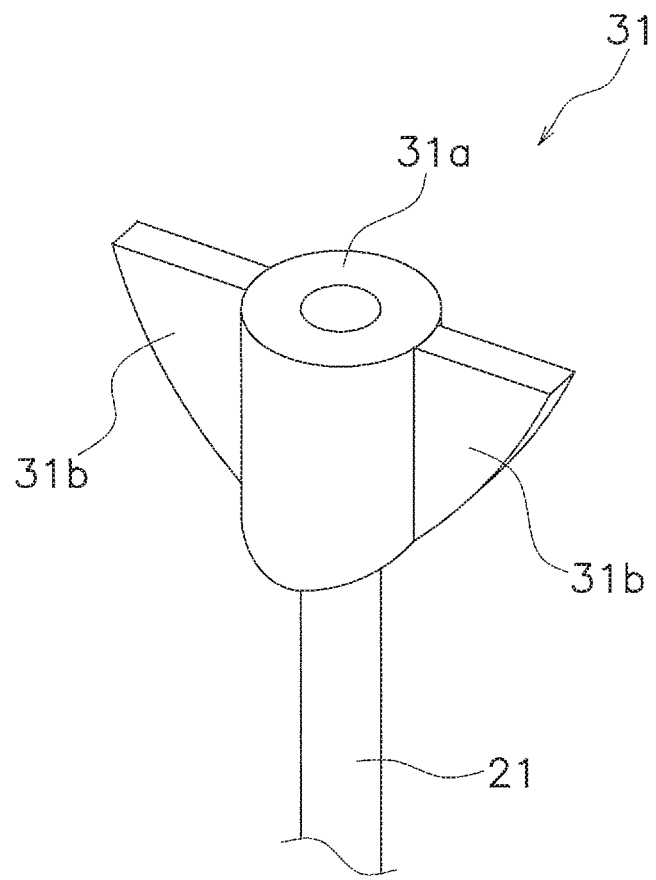
FIG. 8 is a perspective view of a spoke attachment member according to the embodiment.

As shown in FIG. 8, each of the spokes 21 is attached to the spoke attachment member 31. Specifically, one end of the spoke 21 is attached to the spoke attachment member 31, and the other end of the spoke 21 is attached to the front hub assembly 13 or the rear hub assembly 15 (see FIG. 1).

As shown in FIGS. 3 and 7, the base member 27 has a radially outer peripheral part 27a and a radially inner peripheral part 27b. The spoke attachment member 31 is attached to the radially inner peripheral part 27b of the base member 27. Also, the spoke attachment member 31 is attached to the radially inner peripheral part 29b of the cover member 29. The spoke attachment member 31 is attached to the junction 39.

As shown in FIG. 8, the spoke attachment member 31 includes a tubular portion 31a and a projecting portion 31b extending from the tubular portion 31a. In the embodiment, the spoke attachment member 31 includes the tubular portion 31a and a pair of projecting portions 31b that each extend from the tubular portion 31a.

The tubular portion 31a is formed in a substantially tubular shape. The spoke 21 is attached to the tubular portion 31a. Specifically, the one end of the spoke 21 is attached to an inner peripheral portion of the tubular portion 31a.

The pair of projecting portions 31b function as rotation stopper of the tubular portion 31a. The projecting portion 31b is integrally formed on the tubular portion 31a in the embodiment. Alternatively, the projecting portion 31b can be a separate member from the tubular portion 31a. Each of the pair of projecting portions 31b extends outside from an outer peripheral surface of the tubular portion 31a. The pair of projecting portions 31b are arranged at an interval apart from each other in a circumferential direction of the tubular portion 31a.

As shown in FIGS. 5 to 7, the tubular portion 31a and the pair of projecting portions 31b are disposed between the first junction portion 39a and the second junction portion 39b that are adjacent to each other in the circumferential direction. The tubular portion 31a and the pair of projecting portions 31b are clamped by the first junction portion 39a and the second junction portion 39b. In this state, the tubular portion 31a and the pair of projecting portions 31b are attached to the first junction portion 39a and the second junction portion 39b by adhesive.

In the above bicycle rim 25, each member of the bicycle rim 25 is formed as follows.

The base member 27 has a first wear-resistance. The base member 27 has a first specific gravity. Preferably, the base member 27 is made of a non-metallic material. For example, the base member 27 is made of a fiber-reinforced plastic. The truss structure 33 of the base member 27 is preferably formed by injection molding.

The cover member 29 has a second wear-resistance that is larger than the first wear-resistance. The cover member 29 has a second specific gravity that is larger than the first specific gravity. Preferably, the cover member 29 is made of a metallic material. For example, the cover member 29 is made of aluminum.

The spoke attachment member 31 has a third wear-resistance that is larger than the first wear-resistance. The spoke attachment member 31 has a third specific gravity that is larger than the first specific gravity. Preferably, the spoke attachment member 31 is made of a metallic material. For example, the spoke attachment member 31 is made of aluminum. The spoke attachment member 31 is preferably shaped by forging.

Other Embodiments (A) In the above embodiment, explanation is performed as an example in which the truss structure 33 is formed in whole area of the bicycle rim 25. Instead of this, the truss structure 33 is partially formed in the bicycle rim 25.

(B) In the above embodiment, explanation is performed as an example in which the truss structure 33 includes a plurality of truss units 133. Instead of this, the truss structure 33 is formed as a unitary unit.

(C) In the above embodiment, explanation is performed as an example in which the first cover portions 43a, 43b are the same material as the second cover portion 45. Instead of this, a material of the first cover portions 43a, 43b can be different from a material of the second cover portion 45.

(D) In the above embodiment, a brake contact surface, on which each of a pair of bicycle brakes contacts, isn't explained in the explanation of the cover member 29.

The cover member 29 can include the brake contact surfaces. The brake contact surfaces are respectively formed on side portions 29c of the cover member 29, for example, in the first cover portions 43a, 43b.

In this case, preferably, the first cover portions 43a, 43b are made of a metallic material, and the second cover portion 45 is made of a non-metallic material, for example, a fiber-reinforced plastic.

(E) In the above embodiment, explanation is performed as an example in which the cover member 29 includes the pair of first cover portion 43a, 43b. Instead of this, the pair of first cover portion 43a, 43b can be integrally formed as a unitary one-piece member. The cover member 29 can also include equal to or more than 3 piece members.

(F) In the above embodiment, explanation is performed as an example in which the first cover portion 43 and the second cover portion 45 are divided in the radial direction. Instead of this, as shown in FIG. 9, the first cover portion 143 and the second cover portion 145 can be divided in the axial direction.

(G) In the above embodiment, explanation is performed as an example in which the spoke attachment member 31 includes the pair of projecting portions 31b. Instead of this, the spoke attachment member 31 can include a single projecting portion 31b only. The spoke attachment member 31 can also include equal to or more than 3 projecting portions 31b.

(H) In the above embodiment, explanation is performed as an example in which the spoke attachment member 31 (the tubular portion 31a and the projecting portion 31b) is disposed between the first junction portion 39a and the second junction portion 39b in the circumferential direction.

Instead of this, the spoke attachment member 31 can be disposed between a pair of junction portions provided so as to be adjacent to each other in the axial direction.

In this case, one of the pair of junction portions are provided on a radially inner portions of the first and second slanting members 135a, 135b, and a radially inner portions of the first radially extending members 37a. The other of the pair of junction portions is provide on a radially inner portions of the third and fourth slanting members 235a, 235b, and a radially inner portions of the third radially extending members 37c.

General Interpretation of Terms

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment(s), the following directional terms "forward", "rearward", "above", "downward", "vertical", "horizontal", "below", "transverse", "inward" and "outward" as well as any other similar directional terms refer to those directions of the bicycle rim in a state the bicycle rim is mounted to a bicycle. Accordingly, these terms, as utilized to describe the present technology should be interpreted relative to the bicycle rim.

The term "configured" as used herein to describe a component, section, or part of a device implies the existence of other unclaimed or unmentioned components, sections, members or parts of the device to carry out a desired function.

The terms of degree such as "substantially", "about" and "approximately" as used herein mean a reasonable amount of deviation of the modified term such that the end result is not significantly changed.

While only selected embodiments have been chosen to illustrate the present technology, it will be apparent to those skilled in the art from this disclosure that various changes and modifications can be made herein without departing from the scope of the technology as defined in the appended claims. For example, the size, shape, location or orientation of the various components can be changed as needed and/or desired.

Components that are shown directly attached or contacting each other can have intermediate structures disposed between them. The functions of one element can be performed by two, and vice versa. The structures and/or functions of one embodiment can be adopted in another embodiment. It is not necessary for all advantages to be present in a particular embodiment at the same time. Every feature which is unique from the prior art, alone or in combination with other features, also should be considered a separate description of further technologies by the applicant, including the structural and/or functional concepts embodied by such feature(s).

Thus, the foregoing descriptions of the embodiments according to the present technologies are provided for illustration only, and not for the purpose of limiting the technology as defined by the appended claims and their equivalents.

What is claimed is:

1. A bicycle rim comprising:
a base member including a truss structure that defines at least one opening; wherein the truss structure includes a pair of slanting members that intersect with a radial direction with respect to a rotational center axis of the bicycle rim, and a junction joining the pair of slanting members;
a cover member at least partly covering the at least one opening of the base member; and
a spoke attachment member that is a separate member from the base member and the cover member, the spoke attachment member non-rotatably attached to the base member; wherein the spoke attachment member includes a tubular portion protruding in the radial direction at the junction.

2. The bicycle rim according to claim 1; wherein the truss structure further includes at least one radially extending member with respect to the rotational center axis.

3. The bicycle rim according to claim 1; wherein the truss structure further includes a plurality of radially extending members with respect to the rotational center axis.

4. The bicycle rim according to claim 1; wherein the truss structure defines a plurality of openings.

5. The bicycle rim according to claim 4; wherein the cover member completely covers the plurality of openings of the base member.

6. The bicycle rim according to claim 1; wherein the base member has a radially outer peripheral part and a radially inner peripheral part; and
the spoke attachment member is attached to the radially inner peripheral part of the base member.

7. The bicycle rim according to claim 1; wherein the cover member has a radially outer peripheral part and a radially inner peripheral part; and
the spoke attachment member is attached to the radially inner peripheral part of the cover member.

8. The bicycle rim according to claim 1; wherein the truss structure includes a radially extending member with respect to the rotational center axis; and
the junction joins the pair of slanting members and the radially extending member.

9. The bicycle rim according to claim 1; wherein the cover member completely covers the at least one opening of the base member.

10. The bicycle rim according to claim 1; wherein the base member is made of a non-metallic material.

11. The bicycle rim according to claim 10; wherein the base member is made of a fiber-reinforced plastic.

12. The bicycle rim according to claim 10; wherein the truss structure of the base member is formed by injection molding.

13. The bicycle rim according to claim 1; wherein the cover member is made of a metallic material.

14. The bicycle rim according to claim 13; wherein the cover member is made of aluminum.

15. The bicycle rim according to claim 1; wherein the spoke attachment member is made of a metallic material.

16. The bicycle rim according to claim 15; wherein the spoke attachment member is made of aluminum.

17. The bicycle rim according to claim 15; wherein the spoke attachment member is shaped by forging.

18. The bicycle rim according to claim 1; wherein the spoke attachment member includes a projecting portion extending from the tubular portion.

19. The bicycle rim according to claim 1; wherein the base member has a first wear-resistance;
the cover member has a second wear-resistance that is larger than the first wear-resistance; and
the spoke attachment member has a third wear-resistance that is larger than the first wear-resistance.

20. The bicycle rim according to claim 1; wherein the base member has a first specific gravity;
the cover member has a second specific gravity that is larger than the first specific gravity; and
the spoke attachment member has a third specific gravity that is larger than the first specific gravity.

21. The bicycle rim according to claim 1; wherein the cover member includes a first cover portion and a second cover portion; and
the first cover portion is attached to the second cover portion in a state where the bicycle rim is assembled.

22. The bicycle rim according to claim 1; wherein the base member includes an annular truss structure that defines a plurality of openings.

23. The bicycle rim according to claim 1; wherein the cover member has an annular shape.

24. The bicycle rim according to claim 1; wherein the spoke attachment member is attached to a hollow portion provided on the junction.

25. A bicycle rim comprising:
an annular base member having at least one opening; wherein the annular base member includes a pair of slanting members that intersect with a radial direction with respect to a rotational center axis of the bicycle rim, and a junction joining the pair of slanting members;
a cover member at least partly covering the at least one opening of the annular base member; and
a spoke attachment member that is a separate member from the annular base member and the cover member, the spoke attachment member non-rotatably attached to the annular base member; wherein the spoke attachment member includes a tubular portion protruding in the radial direction at the junction.

26. The bicycle rim according to claim 25; wherein the annular base member further includes at least one radially extending member with respect to the rotational center axis.

27. The bicycle rim according to claim 25; wherein the annular base member further includes a plurality of radially extending members with respect to the rotational center axis.

28. The bicycle rim according to claim 25; wherein the annular base member has a plurality of openings.

29. The bicycle rim according to claim 25; wherein the cover member completely covers the at least one opening of the annular base member.

30. The bicycle rim according to claim 28; wherein the cover member completely covers the plurality of openings of the annular base member.

31. The bicycle rim according to claim 25; wherein
the annular base member has a radially outer peripheral part and a radially inner peripheral part; and
the spoke attachment member is attached to the radially inner peripheral part of the annular base member.

32. The bicycle rim according to claim 25; wherein
the cover member has a radially outer peripheral part and a radially inner peripheral part; and
the spoke attachment member is attached to the radially inner peripheral part of the cover member.

33. The bicycle rim according to claim 25; wherein
the annular base member includes a radially extending member with respect to the rotational center axis; and
the junction joins the pair of slanting members and the radially extending member.

34. The bicycle rim according to claim 25; wherein
the annular base member is made of a non-metallic material.

35. The bicycle rim according to claim 34; wherein
the annular base member is made of a fiber-reinforced plastic.

36. The bicycle rim according to claim 25; wherein
the cover member is made of a metallic material.

37. The bicycle rim according to claim 36; wherein
the cover member is made of aluminum.

38. The bicycle rim according to claim 25; wherein
the spoke attachment member is made of a metallic material.

39. The bicycle rim according to claim 38; wherein
the spoke attachment member is made of aluminum.

40. The bicycle rim according to claim 25; wherein
the spoke attachment member includes a projecting portion extending from the tubular portion.

41. The bicycle rim according to claim 25; wherein the spoke attachment member is attached to a hollow portion provided on the junction.

42. A bicycle rim comprising:
an annular base member having at least one opening; wherein the annular base member has a first wear-resistance;
a cover member at least partly covering the at least one opening of the annular base member; wherein the cover member has a second wear-resistance that is larger than the first wear-resistance; and
a spoke attachment member that is a separate member from the annular base member and the cover member, the spoke attachment member non-rotatably attached to the annular base member; wherein the spoke attachment member has a third wear-resistance that is larger than the first wear-resistance.

43. A bicycle rim comprising:
an annular base member having at least one opening; wherein the annular base member has a first specific gravity;
a cover member at least partly covering the at least one opening of the annular base member; wherein the cover member has a second specific gravity that is larger than the first specific gravity; and
a spoke attachment member that is a separate member from the annular base member and the cover member, the spoke attachment member non-rotatably attached to the annular base member; wherein the spoke attachment member has a third specific gravity that is larger than the first specific gravity.

* * * * *